Dec. 18, 1962 C. C. PECK 3,069,534
METHOD OF AND APPARATUS FOR ARC WELDING
Filed Sept. 15, 1960 2 Sheets-Sheet 1

INVENTOR.
Cecil C. Peck.
BY
Oberlin, Maky & Donnelly.
ATTORNEYS.

Dec. 18, 1962   C. C. PECK   3,069,534
METHOD OF AND APPARATUS FOR ARC WELDING
Filed Sept. 15, 1960   2 Sheets-Sheet 2

INVENTOR.
Cecil C. Peck
BY
Oberlin, Maky & Donnelly.
ATTORNEYS.

United States Patent Office 3,069,534
Patented Dec. 18, 1962

3,069,534
METHOD OF AND APPARATUS FOR
ARC WELDING
Cecil C. Peck, Euclid, Ohio, assignor to Cecil C. Peck
Company, Cleveland, Ohio, a corporation of Ohio
Filed Sept. 15, 1960, Ser. No. 56,162
13 Claims. (Cl. 219—137)

The present improvements relating, as indicated, to arc welding have more particular regard to thus welding together relatively thick plates such, for example, as are employed in the manufacture of pressure vessels, heavy structural members and the like. Although not limited thereto, my improved method is also more particularly concerned with arc welding in which a metallic weldrod rather than a carbon electrode is employed to strike the arc. In welding with a metallic weldrod, e.g., a fusible metal electrode which may be in the form of a wire, it is now well established practice to either submerge the arc in a layer of flux deposited along the line to be welded or to surround the arc with a protective gaseous medium, the object in either case being to prevent oxidation of the highly heated metal that results from the action of the arc or the formation of nitrides therein due to exposure of such metal to the oxygen and nitrogen of the atmosphere.

Despite the utilization of expedients such as the foregoing, it has nevertheless remained a continuing problem to produce a perfect and uniform weld between the juxtaposed edges of relatively thick plates or like parts being welded. This is true even where as a further expedient such edges are carefully machined or chamfered so as to present a groove of uniform character throughout the length of the seam being welded. Moreover, in order to insure such uniformity, it is generally necessary to preliminarily tack-weld the juxtaposed edges of the parts so as to insure their placement and retention in proper relation and thus in turn insure uniform welding conditions. In addition there has always remained the problem of securing complete penetration by the arc so as to insure the interfusion and thus the welding of the juxtaposed edges across their entire width and because of tendency of the arc to shift transversely of the seam from one edge to the other of the plates being welded, there results corresponding variation in the transverse location and even the character of the resultant weld.

One object of the present invention is to eliminate not only special precautions in preparing the edges to be welded, but also the necessity of tack-welding the parts so as to insure that such edges will be held in proper relation during the welding operation.

A further object is to insure complete penetration of the arc to the bottom of the seam and at the same time uniformity of the action of the arc in melting down and interfusing the juxtaposed edges. The present invention also provides simple means for mechanically guiding the arc along the seam ot be welded without the use of elaborate electronic or other positioning means.

Finally, my invention provides simple and effective means for introducing alloy ingredients into the weld metal, so that, for example, in welding plates of special alloy composition, the filler metal supplied from the weldrod or wire may be ordinary steel and nevertheless the resulting seam will have the same composition as that of the parts being welded together.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:
FIG. 1 is a side elevation, more or less diagrammatic in character, illustrating the manner in which the two plates to be welded are supported and a conventional arc welding device of the type wherein a metallic weldrod or wire is utilized as the welding electrode;

FIGS. 2 and 3 are transverse sections of such apparatus taken on the planes indicated by the lines 2—2 and 3—3, respectively, FIG. 1;

Figure 2:
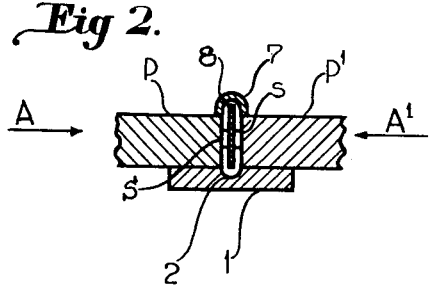
Figure 3:
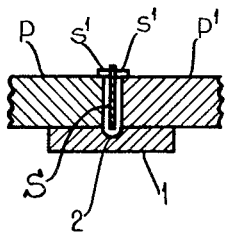

As best illustrated in FIG. 2, the two plates which are to be welded together are supported by conventional means, not shown, with their juxtaposed edges $p$ and $p'$ in properly spaced relation. Actually such edges rest on a conventional back-up plate 1 that is formed with a longitudinal groove 2 and such plate edges are respectively aligned with the edges of such groove. Means, not shown, may also be provided for exerting pressure, as indicated by arrows A, A', on the respective plates transversely of the line of weld, so that except for the means hereinafter described, the juxtaposed edges $p$ and $p'$ would be forced into contact with each other.

Figure 1:
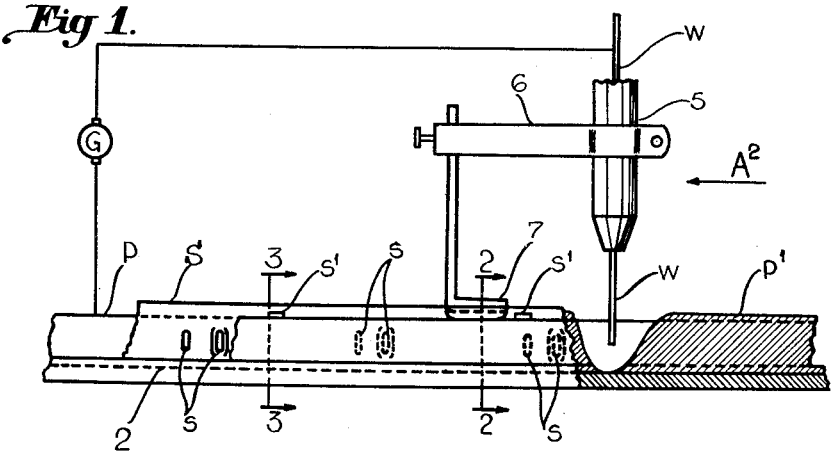

The welder selected for the purpose of diagrammatic illustration in FIG. 1 is of the type which will be found described in U.S. Patent No. 2,536,294 to G. G. Landis et al., dated January 2, 1951, whereby a metal electrode in the form of a wire is fed in the direction of its length continuously to the work and an arc welding current of high density is imposed on such electrode. The only part of such welding apparatus shown is a nozzle 5, through which such weld wire W is thus fed. Said nozzle may be manually manipulated or be mechanically supported so as to be caused to travel generally along the line to be welded, i.e., along the space between the juxtaposed edges of the two plates, the direction of such travel being indicated by the arrow $A^2$ in FIGS. 1 and 4. Adjustably secured to such nozzle by means of an arm or bracket 6 is a shoe 7 which, as shown in the cross sectional view in FIG. 2, is formed on its underside with a groove 8 disposed in the line of travel of the electrode, i.e., longitudinally of the space just referred to.

In order to insure proper uniform spacing of the plate edges $p$ and $p'$ and to accomplish various other objects of the invention, as previously indicated, an element interfusible with such edges is placed in the space therebetween. As best illustrated in FIGS. 5, 5a, 6 and 6a, this element preferably is in the form of a metal strip S, the thickness of which is substantially less than the width of such space, while the width of such strip while approximately the same as that of the plate edges will desirably be somewhat greater. As will be presently explained, the composition of the strip may vary, but it should be sufficiently flexible so that it may be bent laterally to conform to a curve or other irregular line where the seam to be welded is other than straight. Also, said strip may be sufficiently flexible to permit its being wound on a reel from which it may be supplied to the welding operation as required.

Figures 5, 5A:
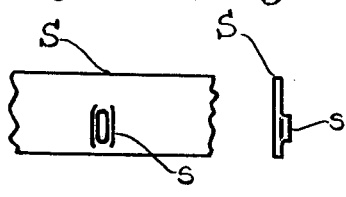
FIG. 5 is a broken side elevation and FIG. 5a a transverse seciton of a portion of the strip-like fusible element that constitutes a feature of the invention, the portion thus illustrated corresponding with that shown at section 2—2, FIG. 1.
Figures 6, 6A:
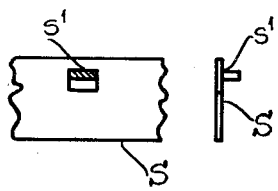
FIG. 6 is a broken side elevation and FIG. 6a a transverse section of a portion of the strip-like fusible element that constitutes a feature of the invention, the portion thus illustrated corresponding with that shown at section 3—3, FIG. 1.

At suitably spaced intervals longitudinally of its extent, the strip is provided with oppositely directed projections $s$. These, as shown in FIGS. 5 and 5a, may be conveniently provided by simply punching out thus in opposite directions a limited portion of the strip itself to form a cleft rounded protuberance. Said projections $s$ plus the thickness of the strip itself should equal the space which it has been ascertained will desirably be maintained between the plate edges $p$ and $p'$ when supported in juxtaposed position over the groove 2 in back-up plate 1. Accordingly, by simply pressing the plates P and P' toward each other, the proper space will be provided without the need for any preliminary gauging and tacking together of the plates. Where, as in its preferred form, the width of the strip S is slightly greater than the width of the juxtaposed plate edges, said strip is also provided at spaced intervals with oppositely extending lateral projections $s'$, as best shown in FIGS. 6 and 6a. These last mentioned projections will desirably be spaced intermediately of the previously described projections $s$ lengthwise of the strip as well as more closely adjacent the upper edge of said strip. They may be conveniently made by striking from the metal of the strip a small horizontally projecting section of such width as to engage and rest upon the surface of the respective plates P, P' adjacent the edges thereof. It will thus be seen that just as the projections $s$ serve to retain the strip equidistantly spaced between the juxtaposed edges of the plates P, P', the projections $s'$ serve to determine the position of the strip vertically in the space between such edges. Accordingly, where, as in its preferred form, the width of the strip is slightly greater than the width of the juxtaposed plate edges, said projections $s'$ will in effect suspend the strip in the space in question with the lower edge thereof clear of the bottom of the groove 2 in back-up plate 1 and at the same time cause the upper edge of the strip to project clear of and slightly above the adjoining surfaces of the plates.

Figure 4:
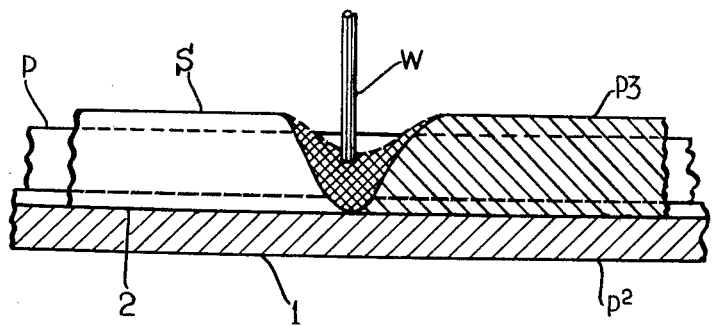
FIG. 4 is a view on a somewhat larger scale of the welding zone, as shown in FIG. 1.

The groove 8 in shoe 7 is designed to engage such upper projecting edge of the strip a short distance in advance of the welding zone and by such engagement the weldrod or wire W will be made to accurately track the strip, i.e., the line to be welded. In other words, due to the manner in which the strip S is supported in the space between the juxtaposed edges of the plates, the arc will be caused to follow a path centrally between such edges, although, if desired, by changing the relative dimensions of projections $s$, such arc may be thus caused to travel closer to the one plate edge than the other. Actually since the strip S equally with the plates P and P', with which it is thus maintained in close contact, are included in the welding circuit, the effect of the arrangement just described will be to confine the arc when struck between electrode W and the work closely to strip S with the result that, as shown in FIG. 4, the latter is progressively melted from the end where the welding operation starts, at the same time that the juxtaposed edges of the plates are melted, and a body W' of weld metal is built up in amount sufficient not only to fill the groove 2 in back-up plate 1, but to form a somewhat larger bead above the edges of the plates, as shown in cross section in FIG. 9.

Figure 7:
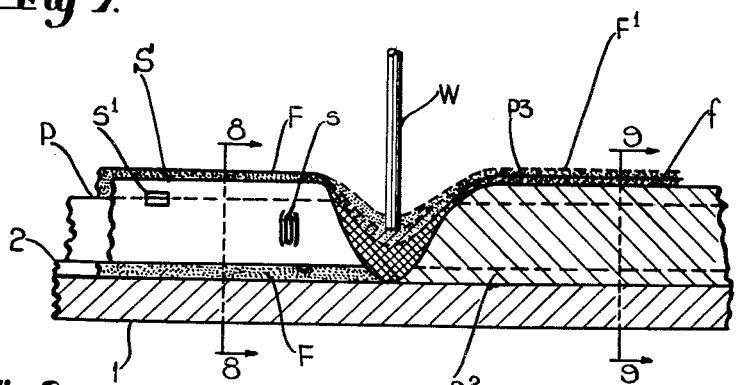
FIG. 7 is a view, similar to that of FIG. 4, illustrating the manner in which granular flux material is employed in conjunction with my improved method of welding so as to provide for a so-called "submerged arc"
Figure 8:
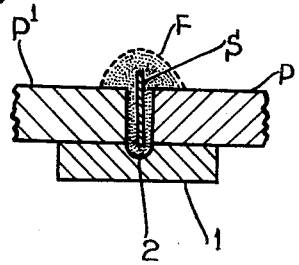
FIG. 8 is a cross section showing the disposition of such flux prior to the welding operation, the plane of such section being indicated by the line 8—8, FIG. 7.
Figure 9:
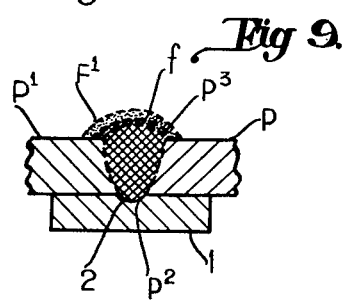
FIG. 9 is a similar cross section showing the finished weld, the plane of such section being indicated by the line 9—9, FIG. 7.

As previously indicated, my improved method is readily adapted for welding with a so-called "submerged arc," wherein a layer of granular flux is employed to enclose the arc during the welding operation. As illustrated in FIGS. 7 and 8, such flux layer F is deposited along the line to be welded in advance of the traverse of such line by the arc. The flux material will desirably be of such degree of fineness as to fill not only the space between the strip S and the juxtaposed edges of plates P and P', but also the groove 2 in back-up plate 1, as well as provide an elongated mound or "windrow," which completely covers not only the space in question, but also the upper edge of the strip which rises above the surface of the plates. As is well known in the operation of such "submerged arc," the intense heat of the latter serves to fuse the adjacent portions of the flux which is thus rendered fluid, is displaced by the molten metal and caused to rise and cover the seam, as shown in FIG. 9. Thus, not only is the metal while molten protected from contamination with atmospheric gases, but after it solidifies to form the weld, it remains covered by a layer $f$ of solidified fused flux, which forms thereover and which may in turn be blanketed by a residual layer F' of unfused flux.

The bead $p^2$ on the under side of the weld will, of course, be defined by groove 2 in back-up plate 1, while the bead $p_3$ on the upper side will be confined and shaped by such solidified flux layer $s$.

Another well known method for protecting the arc, or rather the molten metal produced thereby, against contamination from atmospheric gases is to surround the arc with a stream of a neutral gas, e.g., argon. The utilization of this precedure in connection with my improved method of welding will be readily obvious and therefore does not require separate description.

In addition to providing a blanket of flux, as in the above described "submerged arc" adaptation of my method, the strip S may be coated with a layer of any desired thickness of a selected flux of the kind used in coating weldrod. Also, as previously indicated, the strip may include in its composition selected alloying ingredients. Ordinarily where the welding electrode is in the form of a wire, its composition will be that of ordinary steel. Accordingly, where the plates which are being welded are of a special alloy composition, the interfusion of such weldrod or wire with the plate edges to form the finished weld will obviously result in weld metal of a composition different from that of the plates. While this result may, at least to some extent, be avoided by using a weldrod or wire of the same composition as that of the plates, certain alloy compositions are not readily made in the form of rod or wire and, in addition, the weldrod or wire supplied to the welding apparatus would require to be changed to fit the occasion, whereas by my improved method it is only necessary to employ a strip S of selected composition.

By way of illustrating the efficacy of my improved method of arc welding, I have found it possible to weld with a single pass the juxtaposed edges of a one-half inch plate, at the rate of eighteen inches per minute, and with a current of only 800 amperes. In such example, weld wire one-eighth inch diameter was employed, together with a strip of twenty gauge, the space between the juxtaposed edges of the plate being seven thirty-seconds inch.

The weld thus obtained was found, upon examination, to be free of gas-pockets, solid and homogeneous throughout its length, with tensile strength and other physical qualities equal to those of the plate metal. Of equal, if not greater, significance is elimination of tack-welding and other steps in the setting up of the plate edges for the welding operation, as well as the simplicity and assured accuracy of the arc-guiding means.

It has been deemed unnecessary to show or describe means whereby a layer of granular flux may be laid along the seam that is being welded since equipment for submerged arc welding is well known and generally available. As to the composition of such flux, a considerable number are commercially available and the selection of a particular one to be used may depend on the kind of metal being welded and other conditions. So too, in the case where the arc is surrounded with a protective gas instead of granular flux, such gas may be any of those, in addition to argon, which may be commercially available including carbon dioxide which is being currently used for the purpose. Finally, the formation of a bead on the underside of the weld is optional and may be avoided by simply eliminating the groove in the back-up plate.

Other modes of applying the principle of the invention may be employed, change being made as regards the details described, provided the features stated in any of the following claims, or the equivalent of such, be employed.

I therefore particularly point out and distinctly claim as my invention:

1. In a method of arc welding juxtaposed edges of two metal parts, the steps which comprise supporting such parts with such edges in slightly spaced-apart relation, placing in the space thus provided an element interfusible with such edges, said element being in the form of a strip extending parallel with and of approximately the same width as such edges and having longitudinally spaced lateral projections adapted to predetermine the space between such edges, and longitudinally traversing said element directly with an electric arc.

2. In a method of arc welding juxtaposed edges of two metal parts, the steps which comprise supporting such parts with such edges in slightly spaced-apart relation, placing in the space thus provided an element interfusible with such edges, said element being in the form of a strip extending parallel with and of approximately the same width as such edges and having longitudinally spaced lateral projections adapted to engage the upper surfaces of such plates adjacent such edges thereof and thus determine the position of said strip vertically in the space between such edges, and longitudinally traversing said element directly with an electric arc.

3. In a method of arc welding juxtaposed edges of two metal parts, the steps which comprise supporting such parts with such edges in slightly spaced-apart relation, placing in the space thus provided an element interfusible with such edges, said element being in the form of a strip extending parallel with, spaced substantially equidistantly from, and of approximately the same width as such edges, and longitudinally traversing such element directly with an electric arc.

4. In a method of arc welding juxtaposed edges of two metal parts, the steps which comprise supporting such parts with such edges in slightly spaced-apart relation, placing in the space thus provided an element interfusible with such edges, said element being in the form of a strip extending parallel with, spaced substantially equidistantly from and of slightly greater width than such edges so as to project above the space between the latter, and longitudinally traversing such element directly with an electric arc.

5. In arc welding apparatus, the combination with a relatively movable electrode holder and work support, whereby an arc struck from said electrode may be caused to follow generally an open seam between metal parts carried by said support, of an element interfusible with said parts inserted in such seam, and means slidably laterally interconnecting said electrode holder and said element whereby the latter may serve as a guide for the former.

6. In arc welding apparatus, the combination with a relatively movable electrode holder and work support, whereby an arc struck from said electrode may be caused to follow generally an open seam between metal parts carried by said support, of an element interfusible with said parts inserted in such seam, and means interconnecting said electrode holder and said element whereby the latter may serve as a guide for the former, said means including an arm extending forwardly from said holder adapted detachably, slidably laterally to engage said element.

7. In arc welding apparatus, the combination with a relatively movable electrode holder and work support, whereby an arc struck from said electrode may be caused to follow generally an open seam between metal parts carried by said support, of a strip interfusible with such parts inserted in such seam, and means slidably laterally interconnecting said electrode holder and said strip whereby the latter may serve as a guide for the former, said strip having oppositely directed protuberances adapted to contact with such edges and thus determine the space therebetween.

8. As an article of manufacture, a filler element suitable for interfusion with the slightly spaced-apart edges of two metal parts upon passing an electric arc longitudinally along such edges, said element being in the form of a metallic strip of approximately the same width as such edges and of a thickness substantially less than the space to be maintained therebetween during the welding operation, said strip having oppositely directed lateral projections disposed to contact such edges when such parts are moved towards each other and the overall transverse width of said strip and projections being substantially equal to the space thus to be maintained.

9. As an article of manufacture, a filler element suitable for interfusion with the slightly spaced-apart edges of two metal parts upon passing an electric arc longitudinally along such edges, said element being in the form of a metallic strip of approximately the same width as such edges and of a thickness substantially less than the space to be maintained therebetween during the welding operation, said strip having oppositely directed lateral projections disposed to contact such edges when such parts are moved towards each other and the overall transverse width of said strip and projections being substantially equal to the space thus to be maintained, said strip also having other oppositely directed lateral projections disposed to rest on the upper surfaces of such parts adjacent the edges thereof and thus serve to determine the position of said strip vertically in the space between such edges.

10. As an article of manufacture, a filler element suitable for interfusion with the slightly spaced-apart edges of two metal parts upon passing an electric arc longitudinally along such edges, said element being in the form of a metallic strip of approximately the same width as such edges and of a thickness substantially less than the space to be maintained therebetween during the welding operation, said strip having oppositely directed lateral projections located adjacent one edge thereof and disposed to rest on the upper surfaces of such parts adjacent the edges thereof and thus serve to determine the position of said strip vertically in the space between such edges.

11. As an article of manufacture, a filler element suitable for interfusion with the slightly spaced-apart edges of two metal parts upon passing an electric arc longitudinally along such edges, said element being in the form of a metallic strip of approximately the same width as such edges and of a thickness substantially less than the space to be maintained therebetween during the welding operation, said strip having two series of oppositely directed lateral projections, one such series being located adjacent one edge thereof, the other such series being located intermediately of the edges thereof and the overall transverse width of said strip and last named projections being substantially less than the corresponding width of said strip and first named projections.

12. As an article of manufacture, a filler element suitable for interfusion with the slightly spaced-apart edges of two metal parts upon passing an electric arc longitudinally along such edges, said element being in the form of a metallic strip of approximately the same width as such edges and of a thickness substantially less than the space to be maintained therebetween during the welding operation, said strip having oppositely directed lateral projections located adjacent one edge thereof and disposed to rest on the upper surfaces of such parts adjacent the edges thereof, whereby said strip may be suspended in selected transverse position between such edges.

13. As an article of manufacture, a filler element suitable for interfusion with the slightly spaced-apart edges of two metal parts upon passing an electric arc longitudinally along such edges, said element being in the form of a metallic strip of approximately the same width as such edges and of a thickness substantially less than the space to be maintained therebetween during the welding operation, said strip having oppositely directed lateral projections located adjacent one edge thereof and disposed to rest on the upper surfaces of such parts adjacent the edges thereof with the adjacent edge of said strip projecting above such upper surfaces.

References Cited in the file of this patent

UNITED STATES PATENTS

| | | |
|---|---|---|
| 1,202,115 | Stern | Oct. 24, 1916 |
| 1,453,343 | Fay | May 1, 1926 |
| 1,589,017 | Lincoln | June 15, 1926 |
| 1,604,180 | Lincoln | Oct. 26, 1926 |
| 1,604,181 | Lincoln | Oct. 26, 1926 |
| 1,635,222 | Plant | July 12, 1927 |